United States Patent [19]

Ross

[11] 4,345,920
[45] Aug. 24, 1982

[54] VACUUM DEAERATOR

[75] Inventor: Louis Ross, Des Plaines, Ill.

[73] Assignee: Borg-Warner Corporation, Chicago, Ill.

[21] Appl. No.: 947,211

[22] Filed: Sep. 29, 1978

Related U.S. Application Data

[63] Continuation of Ser. No. 686,763, May 17, 1976, abandoned, which is a continuation of Ser. No. 535,533, Dec. 23, 1974, abandoned.

[51] Int. Cl.³ .............................................. B01D 19/00
[52] U.S. Cl. .......................................... 55/46; 55/55; 55/191; 55/447; 210/167
[58] Field of Search ................. 55/171, 177, 184, 189, 55/191, 203, 447, 46, 55, 57; 210/167

[56] References Cited

U.S. PATENT DOCUMENTS

| | | | |
|---|---|---|---|
| 2,705,053 | 3/1955 | Morris | 55/203 |
| 3,112,190 | 11/1963 | Topol | 55/46 |
| 3,154,087 | 10/1964 | Beaver | 55/55 |
| 3,157,478 | 11/1964 | Edwards | 55/203 |
| 3,201,919 | 8/1965 | Long | 55/46 |
| 3,229,445 | 1/1966 | Kraft | 55/46 |
| 3,273,313 | 9/1966 | Livesey et al. | 55/55 |
| 3,303,895 | 2/1967 | Fontenet | 55/55 |
| 3,345,803 | 10/1967 | Smith | 55/55 |
| 3,371,379 | 3/1968 | Reidenhauser | 55/191 |
| 3,561,193 | 2/1971 | Baronowski | 55/55 |

Primary Examiner—John Adee
Attorney, Agent, or Firm—Julian Schachner

[57] ABSTRACT

A vacuum deaerator for use in a hydraulic system, the vacuum deaerator serving to evolve air out of solution in a hydraulic fluid. The deaerator includes a flow passageway with a flow restricting device at its inlet to induce an initial pressure drop and two discharge ports at its outlet, one for air and the other for hydraulic fluid. A vacuum pump is used to draw fluid through the passageway.

8 Claims, 4 Drawing Figures

U.S. Patent  Aug. 24, 1982  4,345,920
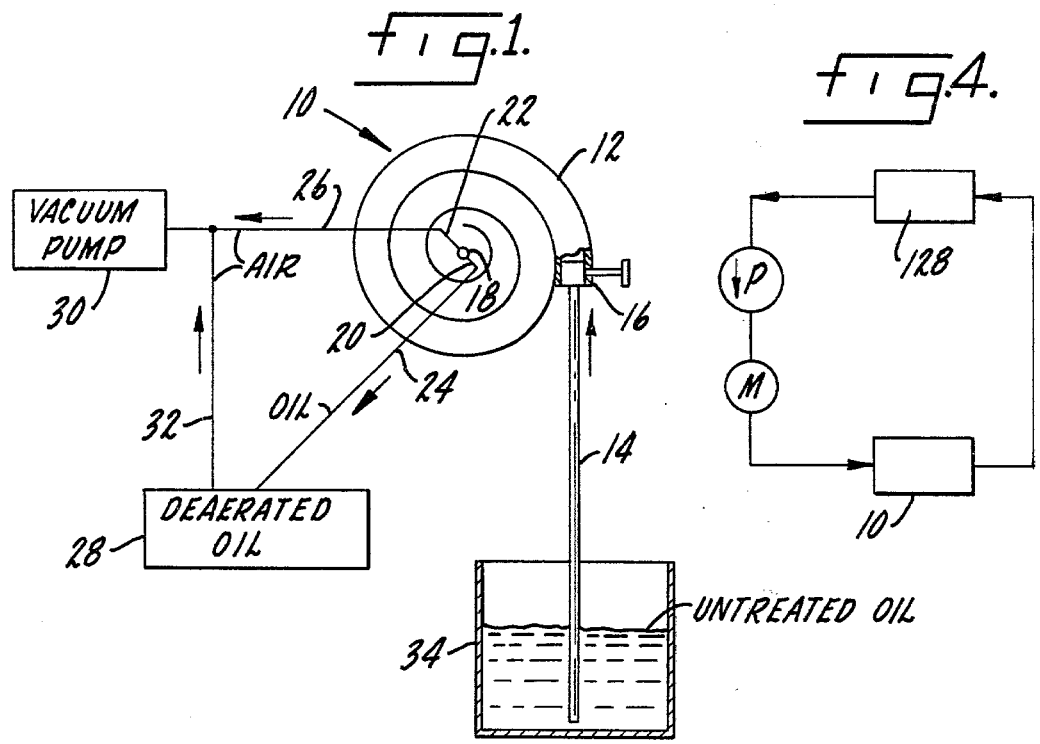
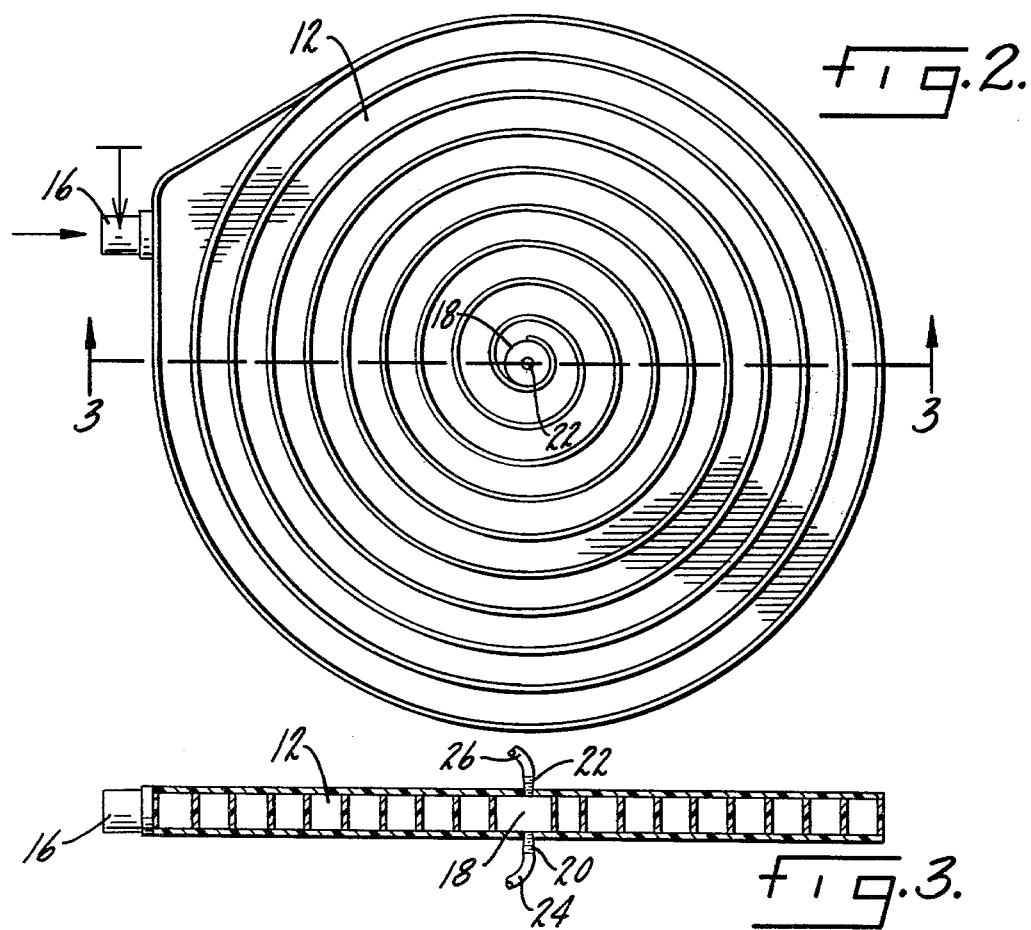

VACUUM DEAERATOR

CROSS-REFERENCE TO RELATED APPLICATIONS

This application is a continuation of U.S. application Ser. No. 686,763 filed May 17, 1976; which in turn is a continuation of U.S. application Ser. No. 535,533 filed Dec. 23, 1974.

BACKGROUND OF THE INVENTION

1. Field of the Invention

This invention relates generally to the deaeration of hydraulic fluid, and more particularly to a vacuum deaerator which provides for evolving air out of solution so as to improve hydraulic system efficiency and effectiveness.

2. Description of the Prior Art

Hydraulic fluids normally contain dissolved air. This does no harm provided the air remains in solution. Under certain circumstances undesolved or free air may be found, and this could be detrimental to the performance of the system and to the life of certain system components, and could cause excessive noise. The interaction between the properties of the hydraulic fluid and the characteristics of the circuit will determine whether aeration problems arise.

The amount of dissolved air is determined by Henry's law, which states that the solubility of a gas in a liquid is directly proportional to the absolute pressure. At atmospheric pressure and room temperature, most mineral based hydraulic fluids contain about 8 to 10 percent by volume of dissolved air. With this air content, if the oil is then subjected to an increased pressure, it will become relatively unsaturated and will tend to dissolve any free air that is available. If the same oil with the same initial air content is exposed to a reduced pressure, it will become relatively supersaturated and air will tend to come out of solution. In the absence of turbulent mixing, this process will be relatively slow for small pressure differences. For sudden and large reductions in pressure, dissolved air may come out of solution more rapidly, indeed with almost explosive violence.

Aeration, or bubble formation, in oil may occur in various ways; as the result of air coming out of solution in regions of low pressure, by entrainment in oil splashing or cascading to a sump, or from leaks in pipes or system components. Air also may be trapped in the system during the filling process unless bleeding is carried out, and the pockets may be dispersed throughout the oil when flow commences. Once free air bubbles are formed, they will continue to grow if the pressure is lower than saturation pressure, or will gradually dissolve if it is higher. The behavior of the hydraulic system under these conditions is relatively inefficient.

Many hydraulic systems are so designed and operate in such a manner that air is alternately dissolved in the oil at relatively high pressure and evolved from the oil at relatively low pressure. This type of operation can give rise to malfunctions of the system components, especially in the case of fluid control systems.

In recent years there has been interest in improving the efficiency of hydraulic systems by deaerating oils used therein. One way in which deaeration has been attempted involves improved sump design; another the use of a wire mesh screen in a sump for separating free air from oil flowing through the sump. Other improvements involve centrifugal or vortex devices.

Prior art systems generally have either been complicated or have been relatively inefficient, and thus ineffective for significantly reducing the amount of air in solution. There remains a continuing need and desire in the art for improved deaeration of oil, either for immediate use in a hydraulic system or for storage in a sealed container for later use.

Removal of dissolved air from oil is most effectively accomplished by two means: decreasing temperature and reducing pressure. Of these, reduction of pressure is more effective whenever extensive removal of air is desired.

The improved vacuum deaerator herein uses a vacuum pump to lower the pressure on oil and also to propel the oil. The deaerator includes a spiral passageway which oil enters at the periphery and from which discharge occurs at the center. The passageway is provided with a flow restricting device at the ingress thereof. This device induces an initial pressure drop. There are two discharge ports at the egress; an upper discharge port for air and a lower discharge port for oil. A container may be filled with oil from the oil discharge port, or alternatively, deaerated oil may be used directly in an associated hydraulic system. The container and the spiral passageway also are subjected to reduced pressure, induced by a single vacuum pump. The deaerator has no moving parts other than this vacuum pump.

BRIEF DESCRIPTION OF THE DRAWINGS

The objects and advantages of this invention will become apparent to those skilled in the art upon careful consideration of the specification herein, including the drawing wherein:

FIG. 1 is a schematic view showing the relationship of components in the vacuum deaerator;

FIG. 2 is an enlarged top view showing details of the spiral passageway;

FIG. 3 is a cross sectional view taken along the line 3—3 of FIG. 2 showing details of the spiral passageway; and FIG. 4 is a partial schematic view showing the vacuum deaerator as part of a hydraulic system.

While this invention is susceptible of embodiment in many different forms, there is shown in the drawing and will herein be described in detail a preferred embodiment with the understanding that the present disclosure is to be considered as an exemplification of the principles of the invention and is not intended to limit the invention to this embodiment.

DESCRIPTION OF THE PREFERRED EMBODIMENT

Referring now to the drawing in greater detail, there is shown in FIG. 1 a schematic representation of a vacuum deaerator 10. Deaerator 10 includes a length of tubing which, for compactness and convenience, is formed in the shape of a spiral passageway 12. Passageway 12 also may be formed from a length of flat coil material wound in a spiral and sealed by top and bottom sheets.

An inlet line 14 communicates with a pressure reducing device 16 at the inlet of passageway 12. In the preferred embodiment of the invention, pressure reducing device 16 is a needle valve which allows controlled variation of the pressure reduction at the inlet of passageway 12. It should be understood, however, that device 16 may be formed as a fixed pressure reducing orifice or the like where such control is not required.

Passageway 12 terminates in an outlet 18 at its center. Communicating with outlet 18 are a lower discharge port 20 and an upper discharge port 22. An oil discharge line 24 is in communication with lower discharge port 20 for carrying deaerated oil away from passageway 12. Similarly, an air discharge line 26 is in communication with upper discharge port 22 for carrying evolved air away from passageway 12.

Oil discharge line 24 leads to a suitable sealed container 28. Air discharge line 26 is connected to the inlet of a suitable vacuum pump 30. In addition, a line 32 communicates sealed container 28 with the inlet of vacuum pump 30.

Inlet line 14 is inserted into an associated open tank 34 containing a supply of oil to be deaerated. As tank 34 is open, the oil therein is at atmospheric pressure, approximately 30 inches of mercury. This oil will contain air in solution at about 8 to 10 percent by volume thereof.

Vacuum pump 30 pulls untreated oil from tank 34 through inlet line 14 and pressure reducing device 16 into spiral passageway 12. The pressure drop across device 16 will reduce the pressure at the inlet of passageway 12, for example to a level, approximately, of from 2 to 4 inches of mercury.

Oil flows through passageway 12 toward outlet 18. It should be understood that the length of tubing which forms passageway 12 is determined by the time required for oil to flow therethrough. This time may vary, depending upon the amount of deaeration desired. A small additional pressure reduction is established in passageway 12 from the inlet toward the outlet thereof. As oil flows toward outlet 18, deaeration occurs and air comes out of solution. It is possible to deaerate oil readily to 1.5 percent air or less with vacuum pump 30 pulling a vacuum of approximately 28 inches of mercury, provided the tubing which forms passageway 12 is long enough such that oil flows for approximately 15 seconds. This length is approximately 275 inches. A certain amount of agitation and shear within passageway 12 further assist deaeration of oil flowing therethrough.

Air is drawn from outlet 18 through upper discharge port 22 and air discharge line 26, and from container 28 through line 32. As a result, oil flows through lower discharge port 20 and oil discharge line 24 into sealed container 28. The oil in container 28 will be deaerated, and may be stored for future use in an appropriate hydraulic system.

FIG. 4 shows vacuum deaerator 10 used for initially filling a closed hydraulic circuit. Oil to be deaerated flows through vacuum deaerator 10 in the manner described hereinabove. Deaerated oil is discharged into a closed reservoir of a system 128, from which it flows through the circuit, including a system pump and a suitable hydraulic motor or the like.

Testing of the vacuum deaerator was performed with oil of approximately 65 centistokes viscosity. With this fluid, and by pulling a vacuum of approximately 28 inches of mercury, it was possible to deaerate the oil readily to about 1.5 percent air from an initial air content of approximately 8 percent.

Tests also were run with the oil heated to approximately 120 degrees F., which reduced the viscosity to about 20 centistokes. At this temperature even better results were achieved. A vacuum of approximately 27 inches of mercury reduced the air content to approximately 0.9 percent by volume. Thus, it is apparent that improved performance may be obtained by heating the oil before it enters spiral passageway 12. This may be accomplished by warming container 34, or by providing inlet line 14 with a heat exchanger or other suitable device.

It should be understood that passageway 12 may be provided without a pressure reducing device 16 at its inlet. In such an event the length of tubing required for comparable deaeration would be much greater than where an initial pressure drop is provided.

The invention disclosed herein will work with a wide variety of oils, and will provide significantly improved overall system efficiency even at low temperatures.

Although a preferred embodiment of the invention has been shown and described, it should be considered as illustrative and may be modified by those skilled in the art without departing from the scope thereof, which is to be limited only by the claims herein.

I claim:

1. A vacuum deaerator comprising fluid passage means having a fluid inlet, a liquid outlet and a gas outlet separate from said liquid outlet, means communicating with said fluid inlet for establishing fluid flow into said passage means at a sub-atmospheric pressure, closed storage means communicating with said liquid outlet, and vacuum inducing means communicating with said storage means and said gas outlet for drawing gas therefrom at a pressure lower than said sub-atmospheric pressure.

2. In a closed hydraulic system including a fluid reservoir, a fluid pump, a fluid motor, means communicating said reservoir with said pump, and means communicating said pump with said motor; the improvement comprising a vacuum deaerator including fluid passage means, pressure reducing means communicating said motor with said fluid passage means for establishing fluid flow into said fluid passage means at a sub-atmospheric pressure, means communicating said fluid passage means with said reservoir, and means for drawing gas from said fluid passage means and said reservoir at a pressure lower than said sub-atmospheric pressure.

3. A vacuum deaerator comprising a fluid passageway having an inlet and first and second outlets, pressure reducing means communicating with said inlet for establishing fluid flow into said passageway at a sub-atmospheric pressure, a sealed fluid container, a vacuum pump, a first fluid line communicating said first outlet with said container, a second fluid line communicating said second outlet with said pump, and a third fluid line communicating said container with said pump independently of said passageway.

4. The invention of claim 3, said passageway being formed as a spiral with said inlet at the periphery thereof and said first and second outlets at the center thereof.

5. The invention of claim 3 or 4, said first outlet being below said second outlet.

6. A method of deaerating fluid having gas dissolved therein, the method comprising the steps of introducing the fluid into a fluid passageway at a sub-atmospheric pressure, providing for fluid flow along the passageway for a time sufficient to evolve the gas out of solution, and directing the deaerated fluid out of the passageway into a sealed container and the evolved gas out of the passageway at a pressure lower than the sub-atmospheric pressure.

7. The method of claim 6, further comprising the step of heating the fluid prior to introducing it into the fluid passageway.

8. A vacuum deaerator comprising fluid passage means constructed and arranged as a helix surrounding a central axis, fluid inlet means located contiguous the outer periphery of said helix in fluid communication with said passage means, fluid outlet means in fluid communication with said passage means and located contiguous the central axis of said helix in fluid communication with closed reservoir storage means for treated liquid, vacuum pump means with first and second conduits operatively connected thereto, said first conduit connected to an upper portion of said helix contiguous its central axis and said second conduit connected to said reservoir storage means.

* * * * *